INVENTOR.
THOMAS F. SPILLANE
BY
Donnelly, Mentag & Harrington
ATTORNEYS

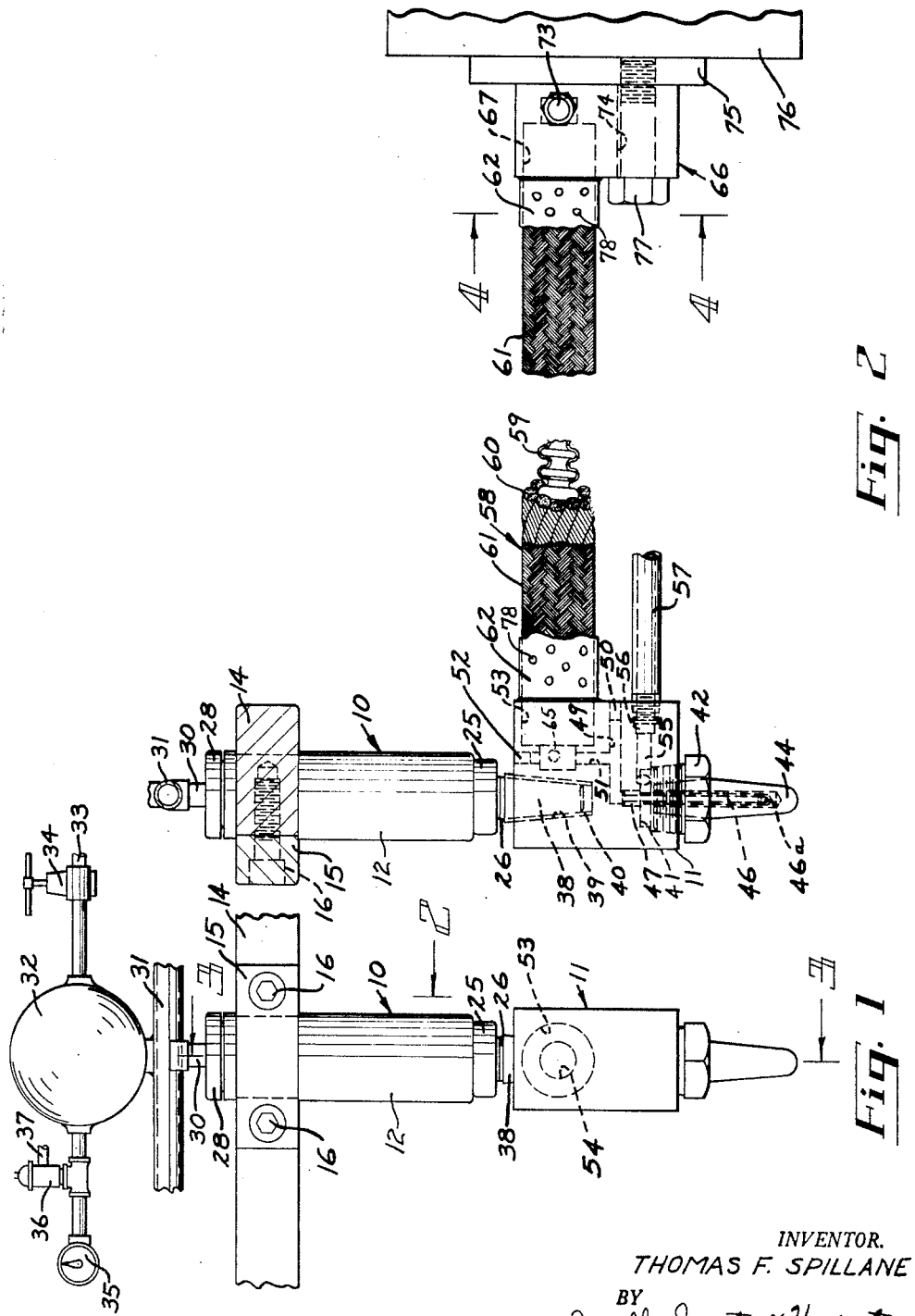

United States Patent Office 2,914,598
Patented Nov. 24, 1959

2,914,598

APPARATUS FOR COOLING A WELDING CABLE

Thomas F. Spillane, Detroit, Mich.

Application April 17, 1957, Serial No. 653,466

1 Claim. (Cl. 174—15)

This invention relates to improvements in apparatus for cooling a welding cable, and, more particularly, to an improved flexible fluid-cooling welding cable and adaptor and terminal blocks for use therewith.

The electrical cables used in spot welding machines are constructed to carry heavy electrical currents, and these currents may go as high as 10,000 to 20,000 amperes. These cables must be flexible and are usually cooled by a suitable fluid such as water. Heretofore, many attempts have been made to provide a cable of this type by forming the core thereof from a winding of springy metal and surrounding this core with a rubber jacket and suitable twisted ropes. It has been found, that such a cable will not stand up under continued and heavy use since the rubber jacket quickly deteriorates and consequent leakage of the cooling fluid ensues. Accordingly, it is the primary object of this invention to provide a novel and improved cooled electrical welding cable and improved adaptor and terminal blocks for connecting the cable to the welding point and to the usual transformer.

A further cause of cable failure of prior art cables of the type described above has been due to breakage of the strands of the enclosing ropes or braids near the terminals of the cables at each end thereof. Accordingly, it is a further object of this invention to provide a cooled welding cable enclosed in a metallic braid of high strength and which may be soldered to a pair of novel and improved end blocks, whereby, a large part of the strain which would otherwise be imposed upon the weaker conductor strands of the cable is taken up by the metallic braid and the end blocks.

It is another object of this invention to provide a novel and improved cooled electrical welding cable which is provided with a flexible fluid-tight core and in which the conductor cables are enclosed in a loose flexible braid of non-magnetic, non-corrosive metallic strands of high tensile strength, which functions to confine the cable against un-due expansion but yet which permits all desired flexing of the cable, and which may be provided with an outer plastic cover without binding the cable so as to impair its flexibility.

It is a still further object of this invention to provide an improved cooled electrical welding cable and adaptor and terminal blocks therefor which will be economical to manufacture, simple and compact in construction, and highly durable in use.

Other objects will appear hereinafter.

It is recognized that various modifications and changes may be made in the details of the structure illustrated without departing from the invention, and, it is intended that the present disclosure shall be considered to be but the preferred embodiment.

Forming a part of this application are drawings, in which,

Fig. 1 is an end elevational view of a spot welding apparatus made in accordance with the principles of the invention;

Fig. 2 is a partial, broken, and partly in section, side elevational view of the structure illustrated in Fig. 1, taken in the direction of the arrow marked "2"

Figure 3:
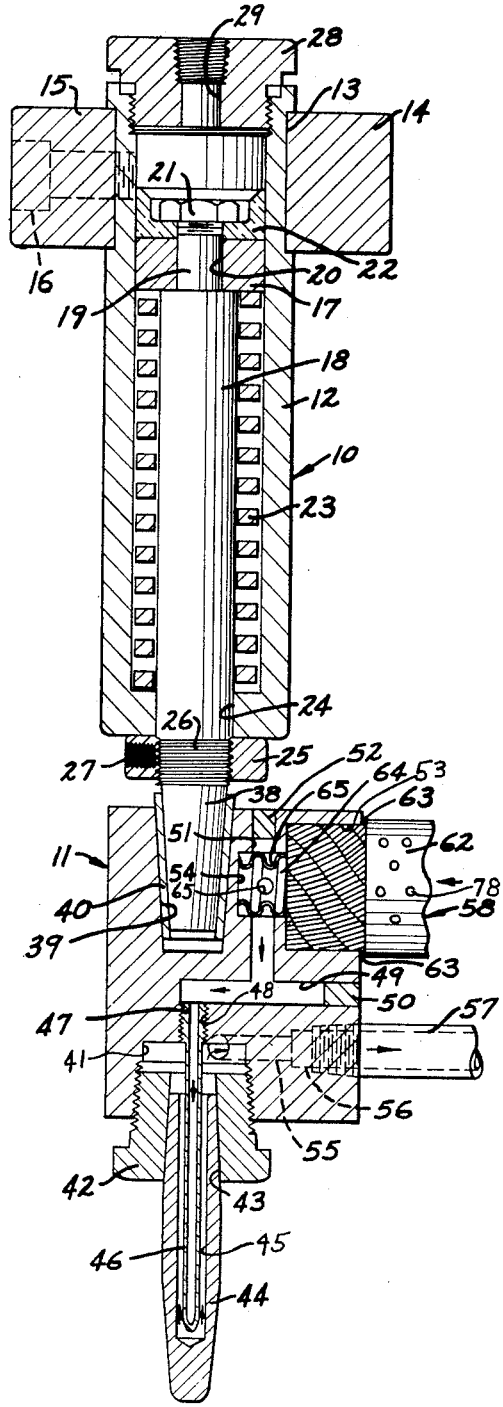
Fig. 3 is an enlarged elevational sectional view of the structure illustrated in Fig. 1, taken along the line 3—3 thereof, and looking in the direction of the arrows.

Referring now to the drawings, and more particularly to Figs. 1, 2 and 3, the numeral 10 generally indicates a usual spot welding gun on the lower end of which is carried an adaptor point block 11, as more fully described hereinafter. The welding gun 10 includes the hydraulic cylinder 12 which is provided adjacent the upper end thereof with an annular groove 13 by means of which the cylinder is adapted to be fixedly mounted on a suitable stationary supporting bar or member 14. The cylinder 12 is fixed on the supporting member 14 by means of the bracket 15 and the bolts 16.

The hydraulic cylinder 12 is provided with the usual piston 17 to which is fixedly secured the piston rod 18 by means of the integral reduced shaft 19 which passes through the aperture 20 in the piston and which is secured in place by means of the nut 21 and the packing member or seal 22. The piston 17 is normally biased upwardly by means of the spring 23 which is disposed in the cylinder 12 and which surrounds the piston rod 18. The lower end of the spring 23 abuts the lower closed end of the cylinder 12. The lower end of the piston rod 18 is slidably mounted through the aperture 24 in the lower closed end of the cylinder 12. The inward or upward movement of the piston 17 and the rod 18 is limited by means of the adjustable stop nut or member 25 which is threadably mounted on the threaded portion 26 on the lower end of the piston rod 18 and which is adapted to be releasably secured in place by means of the lock screw 27.

As shown in Figs. 1, 2 and 3, the upper open end of the cylinder 12 is enclosed by the threaded cap 28 which is provided with the passage 29 therethrough in which is threadably mounted the fluid inlet conduit 30. Hydraulic fluid under pressure may be supplied through the conduit 30 by any suitable conventional means as for example, the conduit 30 may be connected to a supply line or conduit as 31 which would supply a plurality of spot welding guns all mounted side by side as is very common. The conduit 31 would be supplied with fluid under pressure from the supply tank 32 which in turn would be supplied with fluid under pressure by means of the conduit 33 and valve 34, with the conduit 33 being adapted to be connected to a suitable source of fluid under pressure, as a fluid pump. The tank 32 may be supplied with the usual pressure gauge 35, the pressure relief valve 36 and the return conduit 37 which would be connected to a suitable fluid sump tank.

As shown in Figs. 2 and 3, the lower end of the piston rod 18 is tapered as at 38 and is adapted to be press-fitted into a mating tapered hole as 39 in the upper side of the adaptor point carrying block 11. A glass fiber bushing 40 is preferably mounted between the adaptor block 11 and the tapered end 38 of the piston rod 18. The welding point supporting adaptor block 11 is provided on the lower end thereof with an inwardly extended hole as 41 in the outer end of which is threadably mounted the welding point retainer nut or fitting 42. The retainer fitting 42 is provided with the usual axial hole therethrough as 43 in which is fixedly held by a friction fit the welding point 44. The welding point 44 is hollow as indicated by the numeral 45 and is closed at the lower outer end thereof and open at the inner upper end thereof. As shown in Fig. 3, the hollow interior 45 of the welding point 44 communicates with the inner upper end of the hole 41. A hollow tube or conduit 46 is mounted inside of the welding point 44 and extends the length thereof and is formed from a suitable metal as copper or bronze or any other non-corrosive metal. The upper end 47 of the conduit 46 is enlarged and is threadably mounted in the hole 48 which is a reduced extension of the hole 41. The lower end of the conduit 46 is enclosed but is provided with an opening as 46a whereby the interior of the conduit 46 is in communication with the hollow interior 45 of the welding point 44. The upper end of the conduit 46 is open and communicates with the horizontal conduit or passage 49 which may be drilled in the adaptor block 11. The outer end of the passage 49 is enclosed by means of the fixed plug 50. The passage 49 communicates with the vertical passage 51 which may be drilled in the adaptor block 11. The upper end of the passage 51 is enclosed by means of the plug 52.

As best seen in Figs. 2 and 3, a horizontal bore or hole 53 is formed in the side of the adaptor block 11 and a reduced continuation thereof as 54 extends inwardly and communicates with the passage 51. The bore or hole 41 communicates with a horizontal passage 55 at the inner end thereof. The outer end of the passage 55 terminates in the enlarged bore or hole 56 in which is threadably mounted the fluid outlet conduit 57 which would be connected to any suitable drainage system. The bore 53 is the fluid inlet hole for the welding point cooling passage in the adaptor block 11. The adaptor block 11 would be formed from any suitable metal having good electrical conductive qualities, as copper.

Figure 4:
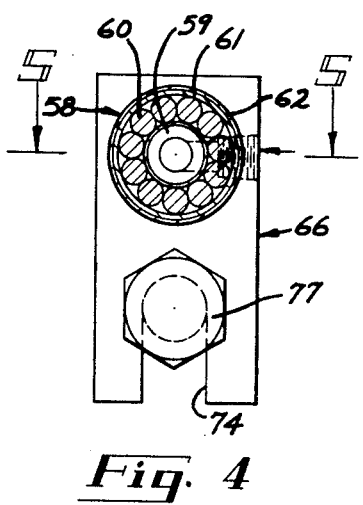
Fig. 4 is an enlarged elevational view, partly in section, of the structure illustrated in Fig. 2, taken along the line 4—4 thereof; and, Fig. 5 is a fragmentary horizontal sectional view of the structure illustrated in Fig. 4, taken along the line 5—5 thereof.

As best seen in Figs. 2, 3 and 4, an electrical, cooled flexible cable 58 made in accordance with the invention is adapted to be mounted with an end thereof in the bore 53 in the adaptor block 11. The cable 58 comprises a flexible tubular fluid-tight conducting bellows type core or conduit 59 which is made from a helically corrugated uni-metal having good qualities of conduction. The cable 58 further includes a plurality of copper wires 60 or other suitable non-corrosive electrical conductors, as a plurality of loosely twisted bunches of small tinned copper strands. The wires 60 are loosely twisted around the core 59 as shown in Fig. 2 to provide a layer of these wires completely around the core 59. The core 59 also functions to cool the wires 60 without interfering with the normal flow of water through the core. The cable 58 is further provided with a sleeve or covering of metal wire braid as 61. The cable 58 is preferably covered with a suitable perforated plastic covering as 62 for anti-scuffing and good wear purposes. The perforations 78 in the plastic covering provide air-cooling of the outer layers of the cable 58.

When mounting the cable 58 in the bore 53 the cable is cut to the desired length, and then the core, copper wires and metal braid are tinned for a certain distance from the end thereof which is to be mounted in the bore 53. As for example, the cable may be tinned for about 1½ inches from the ends inwardly. The ends are then swedged to reduce the diameter to fit the bores in the blocks 11 and 66. As shown in Fig. 3, the plastic covering 62 does not extend into the bore 53 and the core 59 extends outwardly beyond the end of the conductor wires 60 and the core extension is indicated by the numeral 64. The core extension 64 is adapted to extend into the reduced hole or bore 54 and it is provided with suitable apertures in the walls thereof as 65 which communicate the core with the passage 51. The cable 58 is soldered to the block 11 as indicated by the numeral 63.

Figure 5:
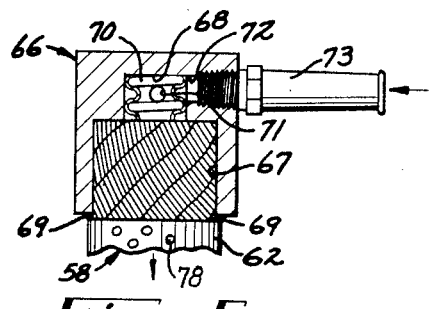

As shown in Figs. 2, 4 and 5, the other end of the cable 58 is mounted in a terminal end block 66 which is provided with a bore or hole 67 similar to the bore 53 in the adaptor block 11. The bore 67 communicates with a reduced inwardly extended bore 68 similar to the bore 54. The other end of the cable 58 would also be tinned as explained hereinbefore and would be soldered in place in the terminal block 66 as indicated by the numeral 69. The core 59 is extended beyond the end of the conductor cables 60 as indicated by the numeral 70 and this extension is provided with suitable apertures therethrough as 71 which communicate the core 59 with a fluid inlet passage 72. A suitable fluid inlet fitting as 73 is threaded into the outer end of the passage 72 and the fitting 73 may be connected in the usual manner with a suitable source of cooling fluid as water.

The terminal block 66 is provided with a U-shaped slot 74 along the lower end thereof as shown in Figs. 2 and 4 and may be fixedly mounted on a supporting block as 75 on a transformer as 76 by means of the bolt 77 which is adapted to pass through the slot 74.

In use, the welding point 44 is raised and lowered by the hydraulic cylinder 10 in the usual and well understood manner. The welding point would be supplied with current from the usual transformer as 76 by means of the conductive adaptor block 11 and terminal block 66 and the conductive wires 60 in the cable 58. The blocks 11 and 66 are preferably formed from C.R. copper. The cooling fluid, as water, would enter the cable core 59 through the inlet fitting 73 and the passage 72. The inlet fitting 73 would be connected to a suitable source of cooling fluid under pressure. The cooling fluid would pass through the core 59 and through the passages 51 and 49 into the tubing 46. The fluid would then pass out of the tubing outlet 46a and into the welding point hollow interior 45 and thence it would flow upwardly through the welding point 44 and into the upper end of the bore 41. The fluid would then be discharged to a suitable drainage source through the passage 55 and the outlet or discharge conduit 57.

It has been found that the cooling system of the present invention increases the safety of a welding gun provided therewith and increases the production available from a welding point. The production of a welding machine provided with a cooling system in accordance with the invention is increased because the machine is constantly producing without numerous shutdowns caused by overheating of the welding point and burning out of the cables. An optimum flow of water has been found to be about two gallons per minute. It has also been found that the welding points last longer thus providing increased life for the points. The cable of the present invention may be used on either air or hydraulically operated spot welding guns. The cable of the present invention reduces costs since they will not burn out and therefore material and labor costs for replacing them are avoided. The novel center core cannot be blocked, as any broken copper strands cannot get into the core. The foregoing results have been obtained in actual production applications.

The improved welding blocks 11 and 66 used in the illustrated system provide a connection construction for the improved cable 58 which prevents sharp localized bending near the ends of the cable where breakage usually occurs, and these blocks further provide a good tension connection with the strong metal braid 61 and establish a good electrical connection with all parts of the cable at the ends thereof. The braid 61 is preferably made from either copper, bronze or stainless steel wire. The conductive braid 61 further tends to hold together any broken strands of the wires 60 which may be broken by extreme flexing and thereby maintains the same amount of electrical conductive capacity despite the fact that the strands are broken. A novel feature of the invention is the tube 46 which carries the cooling fluid down to the lower end of the welding point, whereby, the cooling fluid is delivered to the main point of welding action and heat production.

What I claim is:

A flexible, fluid-cooled electrical cable adapted for use with welding machines, comprising in combination, a central fluid tight bellows core; a layer of loosely twisted flexible conducting strands mounted around said core; a braid mounted around the strands and being formed from a plurality of strands of stainless steel; the ends of the core, conducting strands and braid being swedged together and tinned; and, a perforated plastic covering being mounted around the outer periphery of said braid, thereby allowing air circulation for cooling purposes of the outer layers of the cable while also preventing wear of the braid and shortening of the cables.

References Cited in the file of this patent

UNITED STATES PATENTS

| | | |
|---|---|---|
| 1,539,490 | Hunter | May 26, 1925 |
| 1,750,757 | Johnson | Mar. 18, 1930 |
| 1,784,384 | Paugh | Dec. 9, 1930 |
| 1,853,101 | Von Henke | Apr. 12, 1932 |
| 1,953,915 | Burgett et al. | Apr. 3, 1934 |
| 2,111,027 | Martin | Mar. 15, 1938 |
| 2,175,749 | Eckman | Oct. 10, 1939 |
| 2,222,574 | Robertson | Nov. 19, 1940 |
| 2,234,435 | Johnson | Mar. 11, 1941 |
| 2,341,458 | Martin | Feb. 8, 1944 |
| 2,371,185 | Purat | Mar. 13, 1945 |
| 2,433,588 | Wreford | Dec. 30, 1947 |
| 2,456,902 | Treuthart | Dec. 21, 1948 |
| 2,457,843 | Strickland | Jan. 4, 1949 |
| 2,465,456 | Johnson | Mar. 29, 1949 |
| 2,535,187 | Anderson | Dec. 26, 1950 |